(12) United States Patent
Oshimi et al.

(10) Patent No.: US 6,997,172 B2
(45) Date of Patent: Feb. 14, 2006

(54) FUEL PROPERTIES ESTIMATION FOR INTERNAL COMBUSTION ENGINE

(75) Inventors: Youichi Oshimi, Tokyo (JP); Kazuhiko Abe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/790,767

(22) Filed: Mar. 3, 2004

(65) Prior Publication Data

US 2004/0182378 A1 Sep. 23, 2004

(30) Foreign Application Priority Data

Mar. 18, 2003 (JP) ............................. 2003-073062

(51) Int. Cl.
   *F02D 41/06* (2006.01)
(52) U.S. Cl. .................. 123/685; 123/1 A; 701/109
(58) Field of Classification Search ............. 123/1 A, 123/672, 685, 406.3, 406.31; 701/109
   See application file for complete search history.

(56) References Cited

U.S. PATENT DOCUMENTS

| | | | | |
|---|---|---|---|---|
| 5,231,969 A | * | 8/1993 | Suga | ............... 123/685 |
| 5,400,762 A | * | 3/1995 | Fodale et al. | ............... 123/674 |
| 5,881,703 A | * | 3/1999 | Nankee et al. | ............... 123/1 A |
| 6,714,856 B2 | * | 3/2004 | Huff et al. | ............... 123/1 A |

FOREIGN PATENT DOCUMENTS

| | | | | |
|---|---|---|---|---|
| JP | 5-125977 A | * | 5/1993 | |
| JP | 5-209549 A | * | 8/1993 | |
| JP | 6-26414 | | 2/1994 | |
| JP | 6-229340 | | 8/1994 | |

OTHER PUBLICATIONS

U.S. Appl. No. 10/686,482, filed Oct. 16, 2003, Nagaishi et al.
U.S. Appl. No. 10/768,662, filed Feb. 2, 2004, Abe et al.

* cited by examiner

*Primary Examiner*—Erick Solis
(74) *Attorney, Agent, or Firm*—Foley & Lardner LLP

(57) ABSTRACT

A fuel properties estimating apparatus for an internal combustion engine includes a controller. The controller is configured to determine an estimated component concentration of a component, such as alcohol, in a fuel for the engine in accordance with an actual air fuel ratio of the engine, and to perform a plurality of estimating operations to determine the estimated component concentration at predetermined timings after an engine start of the engine.

15 Claims, 14 Drawing Sheets

LOAD CORRECTION TABLE

TTWS CALCULATION TABLE

TTCT CALCULATION TABLE

TTCN CALCULATION TABLE

TTAVSP CALCULATION TABLE

US 6,997,172 B2

FUEL PROPERTIES ESTIMATION FOR INTERNAL COMBUSTION ENGINE

BACKGROUND OF THE INVENTION

The present invention relates to fuel properties estimating apparatus and process for an internal combustion engine.

A vehicle known as flexible fuel vehicle (FFV) can run on a blend fuel of alcohol and gasoline as well as on gasoline.

An engine system as shown in a Published Japanese Patent Application Publication No. H06(1993)-229340 (pages. 1~3, and FIGS. 1 and 2) is provided with an alcohol concentration sensor for sensing an alcohol concentration in fuel, and arranged to actuate a fuel pump before a start of the engine if fresh fuel is supplied to a fuel tank, to make the alcohol concentration uniform and thereby to provide satisfactory engine performance.

Since the alcohol concentration sensor is costly, there is a method for estimating an alcohol concentration of fuel in accordance with an output signal of an air fuel ratio sensor for sensing an exhaust air fuel ratio of the engine.

SUMMARY OF THE INVENTION

However, the estimation of the alcohol concentration based on the sensed actual air fuel ratio requires stoppage of an evapo purge system, and exerts various other undesired influences. Accordingly, it is desirable to decrease the number of times, and the frequency, of alcohol concentration estimating operations. The estimating system is unable to estimate the alcohol concentration correctly due to transportation lag of fuel if an estimating operation is performed immediately after a start of the engine. If the timing of an estimating operation is delayed, a driver might stop the engine before the estimating operation. In such a case, the system could cause deterioration of engine starting performance and exhaust performance in a next start of the engine.

It is an object of the present invention to provide fuel properties estimating apparatus and/or process for estimating properties of fuel accurately and timely after an engine start.

According to one aspect of the present invention, a fuel properties estimating apparatus for an internal combustion engine, comprises: a controller to determine an estimated component concentration of a component in a fuel for the engine in accordance with an actual air fuel ratio of the engine, the controller being configured to perform a plurality of estimating operations to determine the estimated component concentration at predetermined timings after an engine start of the engine.

According to another aspect of the invention, a fuel properties estimating process comprises: performing a first estimating operation at a first estimating timing after an engine start of the engine, to determine an estimated component concentration of a component in a fuel for the engine in accordance with an actual air fuel ratio of the engine; and performing a second estimating operation at a second estimating timing after the first estimating operation, to determine the estimated component concentration in accordance with the actual air fuel ratio of the engine.

DETAILED DESCRIPTION OF THE INVENTION

Figure 1:
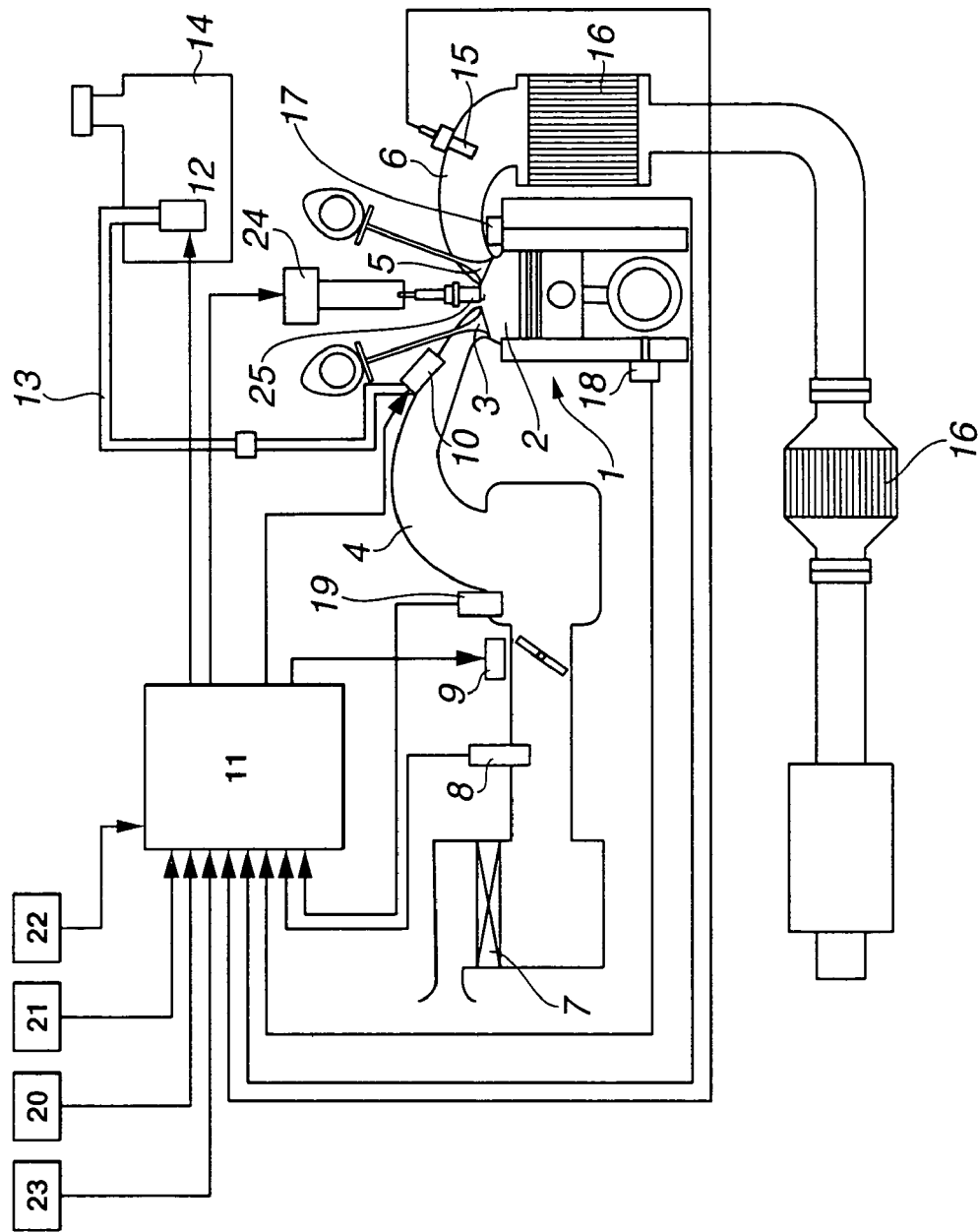
FIG. 1 is a schematic view showing an engine system according to a first embodiment of the present invention.

FIG. 1 shows an engine system, serving as fuel properties (composition) estimating apparatus, according to a first embodiment of the present invention. An engine in this example is of a type capable of using a fuel containing alcohol, which can be used for a flexible fuel vehicle (FFV).

An engine main block 1 includes at least one combustion chamber 2 with which an intake passage 4 is connected through an intake valve 3, and an exhaust passage 6 is connected through an exhaust valve 5.

In intake passage 4, there are provided an air cleaner 7, an air flowmeter 8 for sensing an intake air quantity, a throttle valve 9 for regulating the intake air quantity, and a fuel injector 10 for injecting fuel in the intake air.

An engine control unit (ECU) 11 produces a fuel injection command signal, and commands fuel injector 10 to inject fuel into the intake air to achieve a desired air fuel ratio in accordance with engine operating conditions.

Fuel injector 10 is connected, through a fuel pump 12 and a fuel line (or fuel pipe) 13, with a fuel tank 14. Fuel pump 12 is connected by ECU 11.

In exhaust passage 6, there are provided an oxygen sensor 15 for sensing an oxygen concentration in the exhaust gas mixture, and three-way catalysts 16. Three-way catalysts 16 can convert harmful emissions of hydrocarbons, carbon monoxide, and oxides of nitrogen into less harmful gases with a maximum conversion efficiency in a window of the air fuel ratio around the stoichiometry. Therefore, ECU 11 controls the air fuel ratio of the engine in a feedback control mode based on the output of oxygen sensor 15 located on the upstream side of three-way catalysts 16 so that the actual air fuel ratio swings periodically within the air fuel ratio window. Oxygen sensor 15 serves as an air fuel ratio sensor for sensing an actual air fuel ratio of the engine.

A water temperature sensor 17 senses the temperature of an engine cooling water in engine main block 1. A crank angle sensor 18 senses an engine speed of the engine. An intake air pressure intake air temperature sensor 19 senses an intake air pressure and an intake air temperature in intake passage 4. An accelerator opening sensor 20 senses a depression degree of an accelerator pedal of the vehicle including, as a prime mover, this engine system. An outside air temperature sensor 21 senses an outside air temperature. A vehicle speed sensor 22 senses a vehicle speed of the vehicle. ECU 11 is connected with these sensors, and arranged to receive information from these sensors. Moreover, ECU 11 is connected with an ignition key switch 23, and arranged to receive an ON/OFF signal from ignition key switch 23.

ECU 11 controls an ignition system including an ignition coil 24 having power transistors, and a spark plug 25.

When part of fuel adheres to a cylinder inside wall surface and leaks through a clearance between the piston and cylinder during an engine operation, the engine oil is diluted by the leakage fuel. In case of such dilution, the amount of fuel to be burned in combustion chamber 2 is decreased, and the air fuel ratio might become so lean (air rich) as to exert adverse influence on the drivability and emission control. Moreover, if the oil-diluting fuel evaporates from the engine oil and enters the intake system by being sucked through a blowby system, the air fuel ratio might become so rich (fuel rich) as to exert adverse influence on the drivability and emission control.

Therefore, the engine system shown in FIG. 1 estimates an oil-diluting fuel quantity of fuel mixed in engine oil in the following manner.

Figure 2:
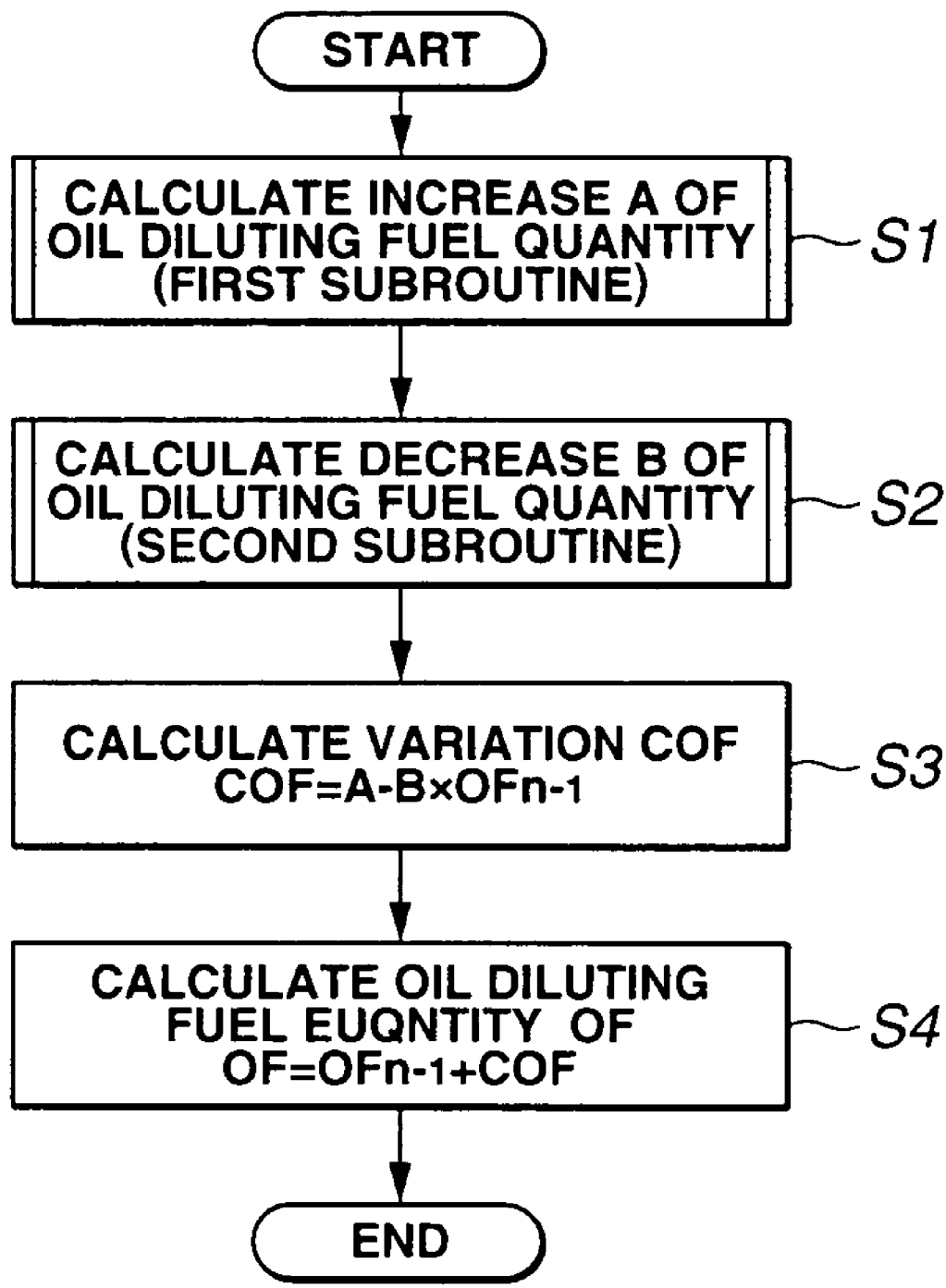
FIG. 2 is a flowchart showing an oil-diluting fuel quantity estimating process performed by the engine system of FIG. 1.

FIG. 2 shows a process for determining an oil-diluting fuel quantity OF. This process is performed at regular time intervals of a predetermined time length.

Step S1 is a first subroutine for calculating an increase quantity (or increase) A of an oil-diluting fuel quantity. Step S2 is a second subroutine for calculating a decrease rate B of the oil-diluting fuel quantity. Step S3 calculates a variation quantity COF of the oil-diluting fuel quantity by using the increase quantity A calculated at S1 and the decrease rate B calculated at S2. In this example, COF=A−B×OFn−1. The quantity B×OFn−1 corresponds to a decrease quantity. In this equation, OFn−1 is a previous value of the oil-diluting fuel quantity OF calculated in a previous cycle. Step S4 calculates the oil-diluting fuel quantity OF. In this example, OF=OFn−1 +COF.

Figure 3:
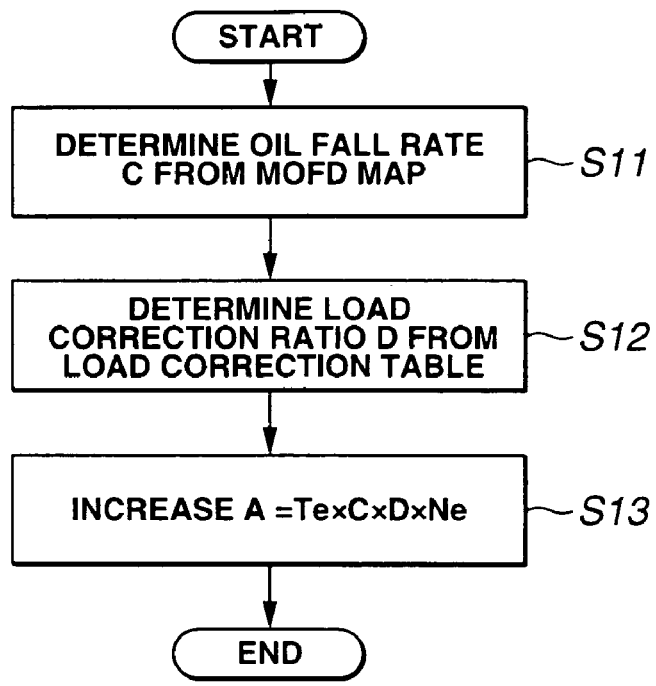
FIG. 3 is a flowchart showing a first subroutine of step S1 of FIG. 2.
Figure 4:
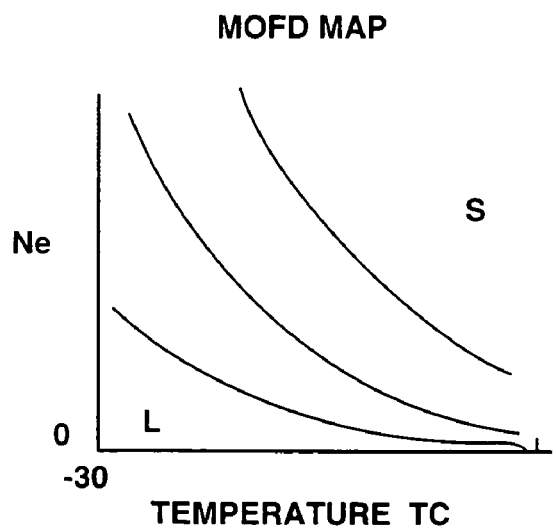
FIG. 4 is a graph illustrating a MOFD map used in the first subroutine of FIG. 3.

FIG. 3 shows the first subroutine of S1 shown in FIG. 2. Step S11 calculates a fuel fall rate C by looking up from a MOFD map. Fuel fall rate C is an increase rate of the increase quantity A. FIG. 4 illustrates MOFD map employed in this example. The MOFD map is designed to determine fuel fall rate C from an engine temperature and an engine speed Ne. The example of FIG. 4 employs, as engine temperature, a cylinder wall temperature TC. As shown in FIG. 4, the fuel fall rate C increases as engine speed Ne decreases, and the fuel fall rate C increases as engine cylinder wall temperature TC becomes lower. When the engine speed becomes low, the gas motion is slower, the evaporation and atomization of fuel are poor, and the fuel is more apt to adhere to a cylinder wall The cylinder wall temperature Tc is taken into account because the volatility of the fuel is influenced by the engine temperature. In FIG. 4, the fuel fall rate C is large in a region denoted by L, and becomes small in a region denoted by S.

Figure 5:
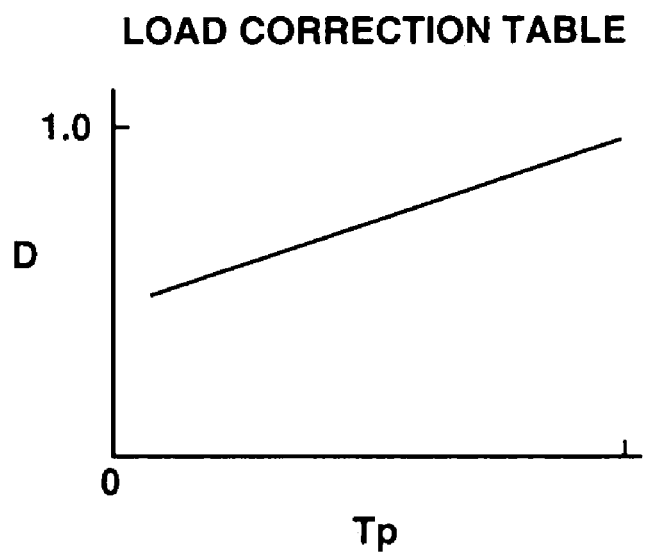
FIG. 5 is a graph illustrating a load correction table used in the first subroutine of FIG. 3.

Step S12 calculates a load correction ratio D by lookup from a load correction table. FIG. 5 illustrates the load correction table employed in this example. The load correction table is designed to determine the load correction ratio D from a base fuel injection quantity Tp which is calculated from engine speed Ne and an intake air quantity Qa, as an engine load, determined from an output of an air flowmeter 8. The load correction ratio D increases with increase in the load because the proportion of unburnt fuel becomes greater in combustion chamber 2. This is because the fuel volatility is influenced by the pressure.

Step S13 calculates the increase quantity A by using fuel fall rate C, load correction ratio D, engine speed Ne, and a fuel injection quantity Te, as engine load, determined from one or more engine operating conditions. That is; $A=Te \times C \times D \times Ne$.

Figure 6:
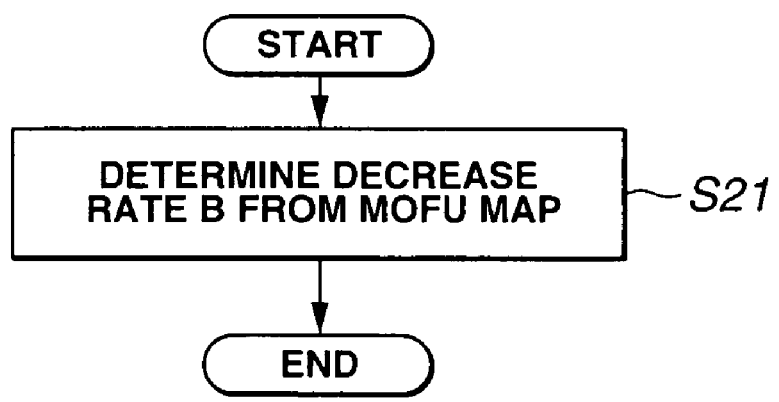
FIG. 6 is a flowchart showing a second subroutine of step S2 of FIG. 2.
Figure 7:
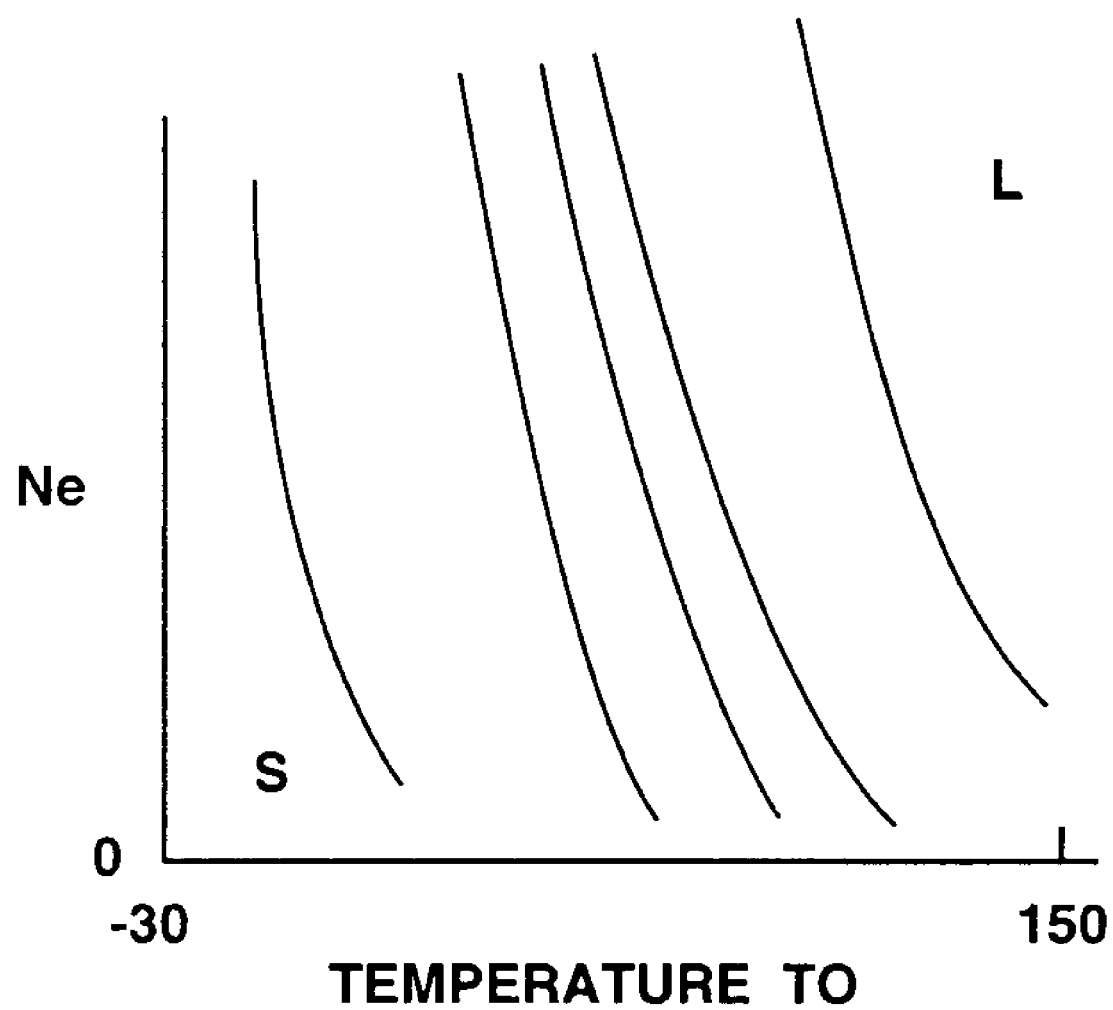
FIG. 7 is a graph illustrating a MOFU map used in the second subroutine of FIG. 6.

FIG. 6 shows the second subroutine of S2 shown in FIG. 2. Step S21 looks up in MOFU map shown in FIG. 7, and thereby calculates the decrease rate B representing an evaporation rate of the oil-diluting fuel from the engine oil. FIG. 7 shows MOFU map employed in this example. This MOFU map is designed to determine the decrease rate B from an oil temperature TO and engine speed Ne. Because of the volatility of the fuel, decrease rate B increases as oil temperature To becomes higher. As engine speed Ne increases, the decrease rate B increases because evaporation of fuel in engine oil is promoted by circulating mixing of oil with an oil pump, and oil stirring by a counterweight of a crank shaft. Decrease rate B is great in a region denoted by L in FIG. 7, and small in a region denoted by S.

Figure 8:
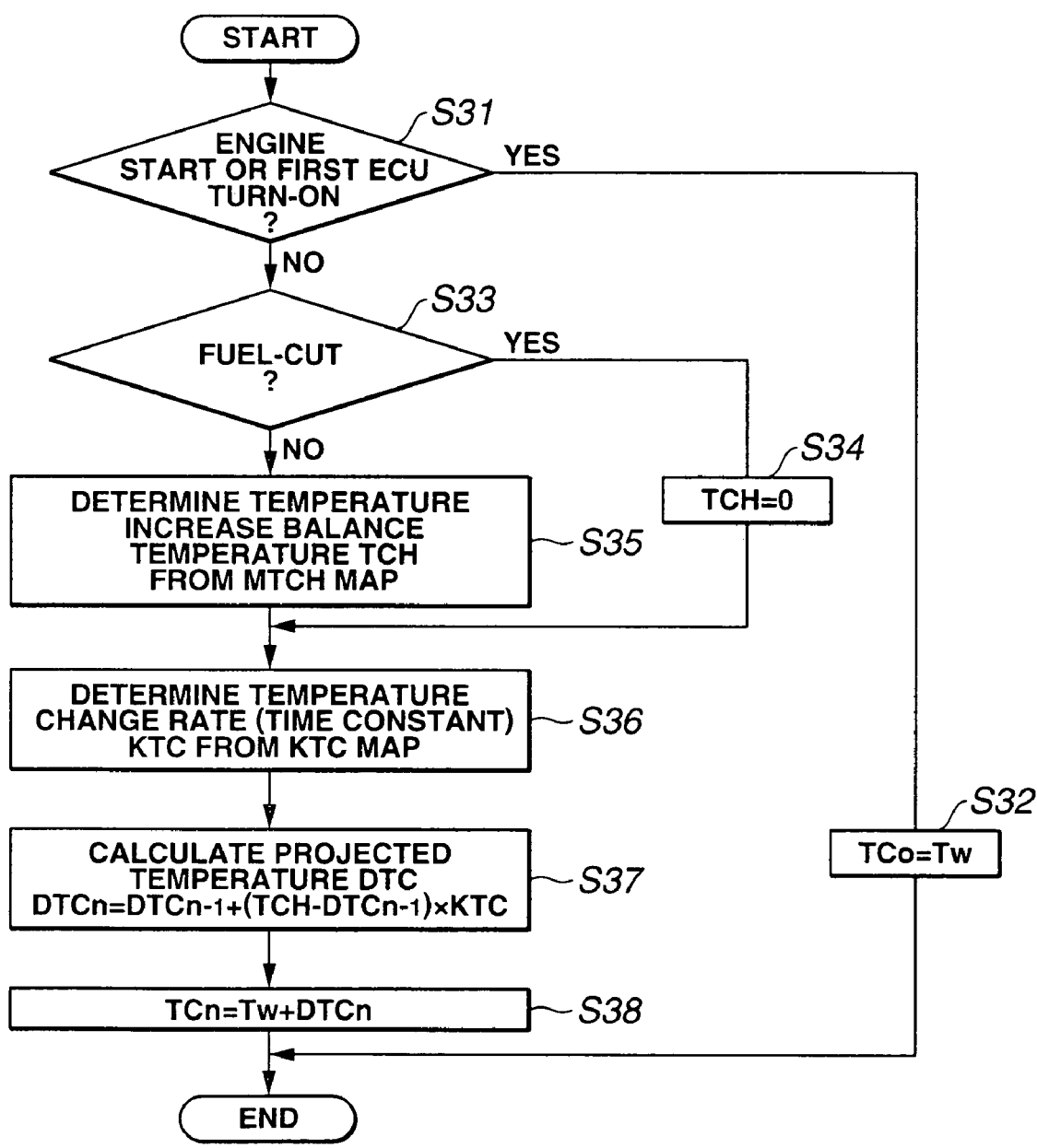
FIG. 8 is a flowchart showing a process for predicting an engine cylinder wall temperature TC which can be employed in the first subroutine.

FIG. 8 shows a process for projecting or predicting the cylinder wall temperature TC used for calculating increase quantity A. The engine system of this example employs the process for predicting the cylinder wall temperature instead of a temperature sensor directly sensing the engine cylinder temperature.

Step S31 examines whether the engine is in an engine starting operation or in an operation first supplying electricity to ECU 11. In the case of the engine starting operation, or the first operation of supplying electricity first to ECU 11, the process proceeds from S31 to step S32. Step S32 sets an initial engine cylinder wall temperature TCo, that is an initial value of cylinder wall temperature TC, equal to an engine cooling water temperature Tw, for preparation for temperature increase in subsequent calculation cycles.

When neither of the engine starting operation and the ECU first energizing operation is detected, the process proceeds from S31 to step S33 to examine whether a fuel cutoff operation is in progress. If the engine is under the fuel cutoff operation, the process proceeds from S33 to step S34. The process proceeds from S33 to step S35 when the engine is not in the fuel cutoff state.

When the engine is in the fuel cutoff state, the cylinder wall temperature TC converges toward the engine cooling water temperature Tw. Therefore, step S34 sets a temperature increase balance temperature TCH from engine cooling water temperature Tw, equal to zero (TCH=0).

Figure 9:
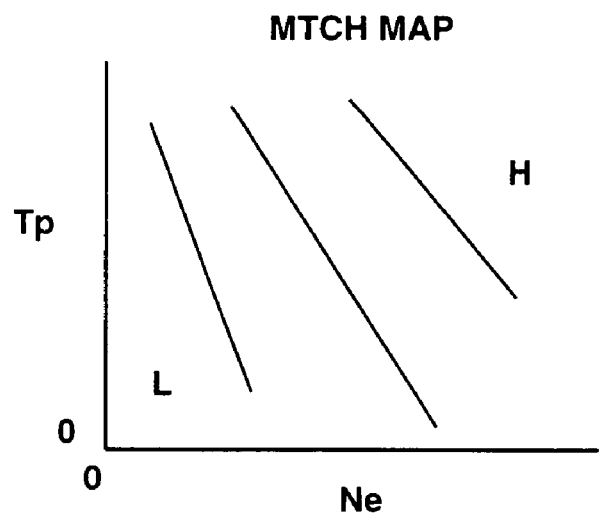
FIG. 9 is a graph illustrating a MTCH map used in the process of FIG. 8.

When, on the other hand, the engine is not in the fuel cutoff state, step S35 calculates the temperature increase balance temperature TCH by using a MTCH map shown in FIG. 9. Temperature increase balance temperature TCH represents a temperature difference between cylinder wall temperature TC and engine cooling water temperature Tw. FIG. 9 shows MTCH map employed in this example. MTCH map is designed to determine temperature increase balance temperature TCH from engine speed Ne and base fuel injection quantity Tp. Temperature increase balance temperature TCH is strongly related to the combustion temperature. Accordingly, temperature increase balance temperature TCH increases as engine speed Ne increases, and increases as base fuel injection quantity Tp, that is engine load, increases. In FIG. 9, H stands for "high", and L for "low".

Figure 10:
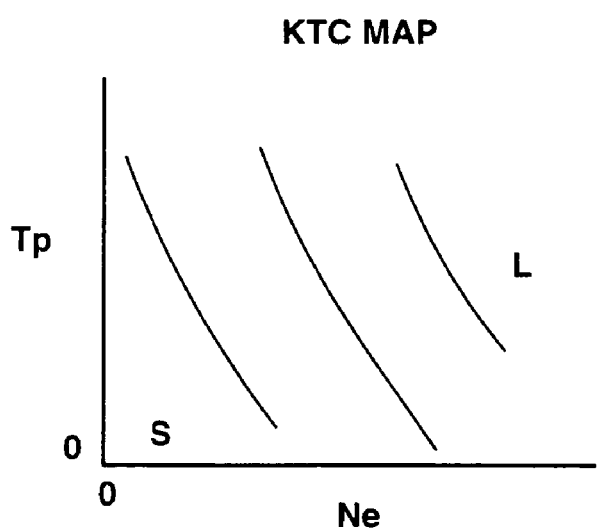
FIG. 10 is a graph illustrating a KTC map used in the process of FIG. 8.

After S35 or S34, step S36 calculates a temperature change rate KTC corresponding to a time constant of the temperature, by lookup in a KTC map shown in FIG. 10. FIG. 10 shows KTC map employed in this example. KTC map is designed to calculate the temperature change rate KTC from engine speed Ne and base fuel injection quantity Tp serving as engine load. Temperature change rate KTC receives great influence from engine speed Ne because the gas flow velocity is predominant in the heat transmission to cylinder wall. Moreover, temperature change rate KTC has a sensitivity to base fuel injection quantity Tp or the engine load because of influence on the heat transmission by the pressure. Thus, temperature change rate KTC increases as engine speed Ne increases, and as base fuel injection quantity Tp increases. In FIG. 10, L stands for "large" and S for "small".

In this example, each of the temperature increase balance temperature TCH and temperature change rate KTC is determined by using a map of engine speed Ne and base fuel injection quantity Tp. However, if the required accuracy is relatively low, it is possible to prepare calculation tables based on the intake air quantity Qa sensed by the air flow meter, respectively, for TCH and KTC, and to determine each of TCH and KTC in accordance with Qa by using the corresponding calculation table.

Step S37 following S36 determines an instantaneous projected temperature DTC from temperature increase balance temperature TCH and temperature change rate KTC. This projected temperature DTC represents a temperature difference from the engine cooling water temperature Tw. Projected temperature DTC of this example is given by: $DTCn=DTCn-1+(TCH-DTCn-1) \times KTC$. This equation is in the form of a first order lag. Projected temperature DTC follows the temperature increase balance temperature TCH with a first order lag. The form of first order is employed because it seems that the temperature varies with a constant rate because of balance with escape of heat. Projected temperature is regarded as having a rising waveform similar to a rising waveform of a valve temperature which was measured by the inventors of the present invention. In the above equation, $DTCn-1$ is a value of the projected temperature calculated in a previous calculation cycle.

Step S38 determines the cylinder wall temperature TCn by adding the projected temperature DTCn determined at S37, to the engine cooling water temperature Tw $(TCn=Tw+DTCn)$. Then, the process for projecting cylinder wall temperature ends. In this example, each of the temperature increase balance temperature TCH and the projected temperature DTC is an amount of temperature increase from the engine cooling water temperature Tw. Therefore, step S38 performs the addition of Tw.

In the example shown in FIG. 8, the engine cylinder wall temperature TC is predicted by calculation to the advantage of cost reduction. However, to improve the accuracy, it is optional to employ a temperature sensor embedded in the cylinder to sense the cylinder wall temperature directly.

Figure 11:
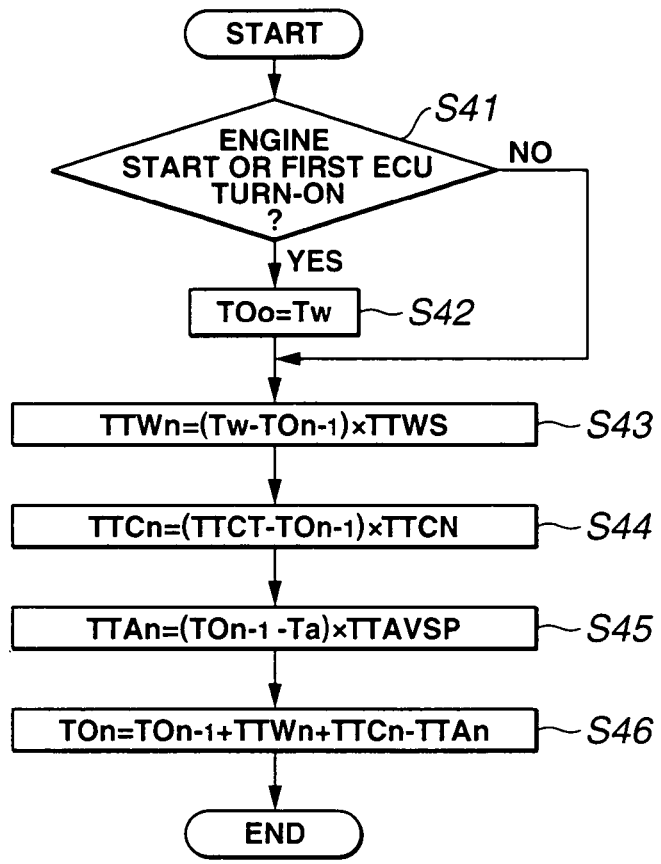
FIG. 11 is a flowchart showing a process for predicting an oil temperature TO which can be employed in the second subroutine.

FIG. 11 shows a process for projecting or predicting the oil temperature TO used for calculating the decrease rate B (the evaporation rate of oil-diluting fuel) by using MOFU map of FIG. 7.

Step S41 examines whether the engine is in the engine starting operation or in the first energy supplying operation first supplying electricity to ECU 11. In the case of the engine starting operation, or the first operation of supplying electricity first to ECU 11, the process proceeds from S41 to step S42. Step S42 sets an initial engine oil temperature TOo, that is an initial value of oil temperature TO, equal to the engine cooling water temperature Tw. When neither of the engine starting operation and the ECU first energizing operation is detected, the process proceeds from S41 directly to step S43.

Step S43 calculates a heat flow quantity TTW of the engine oil and engine cooling water, from the engine cooling water temperature Tw, TTWS, and a previous oil temperature TOn-1 which is a previous value of oil temperature calculated in a previous calculation cycle, by using $TTWn=(Tw-TOn-1) \times TTWS$. The heat transfer quantity is proportional to a temperature difference, and a function of a flow velocity. Therefore, in this equation, the temperature difference is multiplied by TTWS determined from engine speed Ne.

Figure 12:
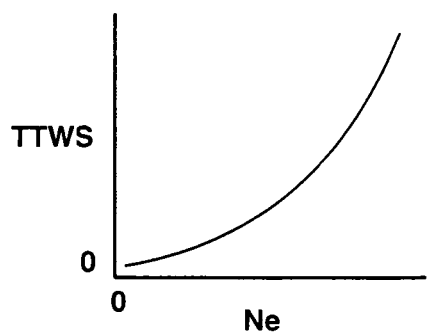
FIG. 12 is a graph illustrating a TTWS calculation table used in the process of FIG. 11.

FIG. 12 shows a TTWS calculation table employed in this example, for determining TTWS. As shown in FIG. 12, TTWS increases as engine speed Ne increases. Engine speed Ne is used for calculation of TTWS because the heat transfer among the cylinder block, cylinder head and engine oil is proportional to engine speed Ne of the engine driving the oil pump. Heat transmitted from the oil pan can be taken into account by raising the characteristic of FIG. 12 by an appropriate amount.

Step S44 calculates a heat flow quantity TTC with the combustion, from the engine cooling water temperature Tw, TTCT, TTCN and the previous oil temperature TOn-1, by using $TTCn=(TTCT-TOn-1) \times TTCN$.

Figure 13:
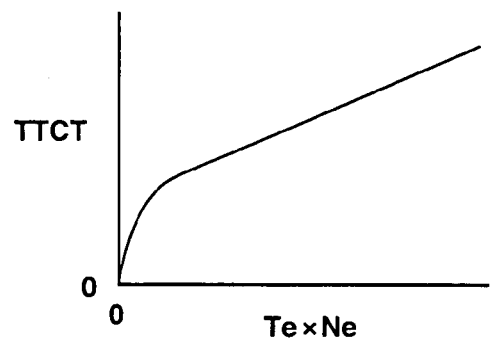
FIG. 13 is a graph illustrating a TTCT calculation table used in the process of FIG. 11.
Figure 14:
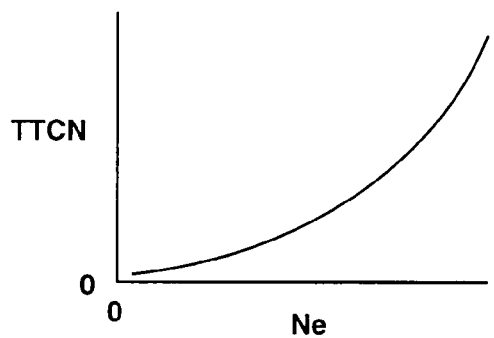
FIG. 14 is a graph illustrating a TTCN calculation table used in the process of FIG. 11.

FIG. 13 shows a TTCT calculation table employed in this example, and FIG. 14 shows a TTCN calculation table of this example. TTCT represents a piston cylinder wall temperature, and is related with the combustion temperature. Therefore, TTCN is determined from a product between fuel injection quantity Te and engine speed Ne by using the table of FIG. 13. As shown in FIG. 13, TTCT increases as the product TexNe increases. TTCN represents an engine oil flow velocity for heat transmission, and is determined from engine speed Ne by using the table of FIG. 14. As shown in FIG. 14, TTCN increases as Ne increases.

Figure 15:
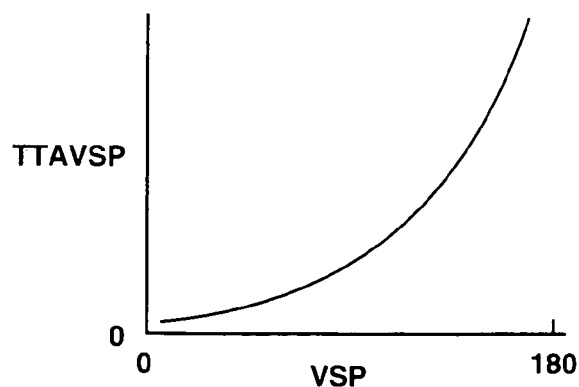
FIG. 15 is a graph illustrating a TTAVSP calculation table used in the process of FIG. 11.

Step S45 calculates a heat release quantity TTA to the outside air, according to $TTAn=(TOn-1-Ta) \times TTAVSP$. In this equation, Ta is an outside air temperature sensed by outside air temperature sensor 21, and TTAVSP is a flow velocity for heat transmission calculated from vehicle speed VSP sensed by vehicle speed sensor 22. FIG. 15 shows a TTAVSP calculation table employed in this example. TTAVSP increases as VSP increases.

Step S46 calculates the oil temperature TOn according to TOn=TOn−1+TTWn+TTCn−TTAn. This equation is obtained by modeling a phenomenon in which the engine oil is warmed by the engine cooling water and the cylinder due to combustion, and cooled by wind due to vehicle movement (and engine cooling water). The thus-obtained oil temperature TO is used for calculating the evaporation rate of the oil-diluting fuel.

In the example shown in FIG. 11, the engine oil temperature TO is predicted by calculation to the advantage of cost reduction. However, to improve the accuracy, it is optional to employ a temperature sensor to sense the oil temperature directly. In the example of FIG. 11, outside air temperature Ta is used as a factor for cooling the oil pan, and warm air from a radiator is neglected. However, in the case of a vehicle in which the warm air from the radiator is influential, it is possible to improve the accuracy by modifying the outside air temperature Ta in consideration of the warm air from the radiator.

Fuel containing alcohol requires a large amount of fuel injection as compared to ordinary gasoline to obtain a given equivalence ratio because of the number of atoms of C (carbon), so that adjustment of the fuel injection quantity is required. Therefore, the engine system is arranged to predict the alcohol concentration of fuel accurately as quickly as possible, by utilizing the output signal of oxygen concentration sensor 15. In this embodiment, alcohol is a component in fuel, and the alcohol concentration is a component concentration estimated by the system.

Figure 16:
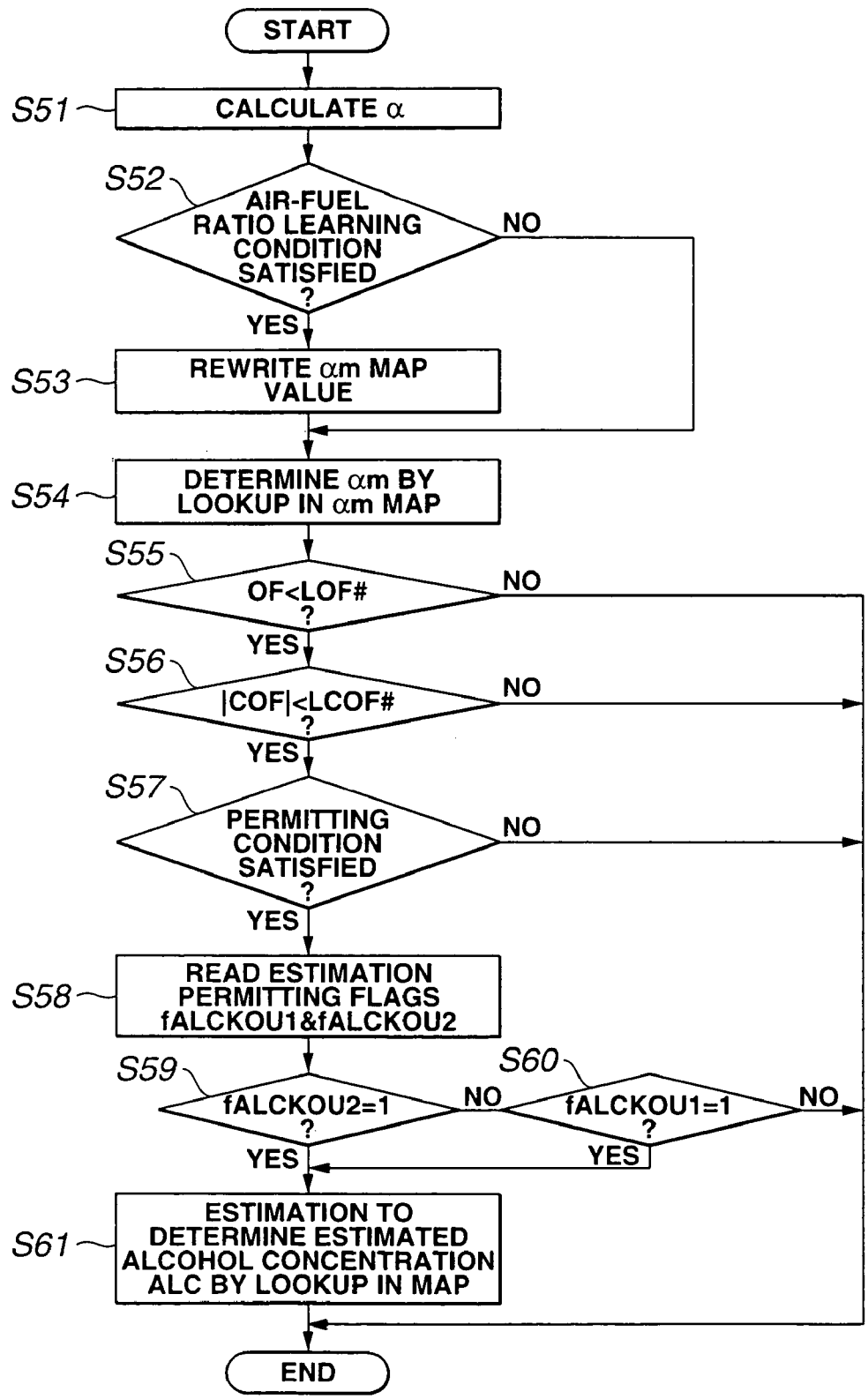
FIG. 16 is a flowchart showing a process for estimating an alcohol concentration of fuel, performed by the engine system of FIG. 1.

According to the first embodiment, the engine system estimates the alcohol concentration in the fuel, as a single component concentration by following a process shown in FIG. 16.

Step S51 reads an air-fuel ratio feedback coefficient α calculated from the output of oxygen concentration sensor 13.

Step S52 examines whether an air-fuel ratio learning condition is satisfied or not. When the learning condition is satisfied, the process proceeds to step S53, rewrites a map value in an αm calculation map for each operating region at S53, and then proceeds to step S54. When the learning condition is not satisfied, the process proceeds directly to S54 without performing the map rewriting operation of S53. In this example, αm is an air-fuel ratio learning correction coefficient calculated from air-fuel ratio feedback coefficient α+. The air-fuel ratio feedback correction coefficient α and air-fuel ratio learning correction coefficient αm are parameters used for the feedback air-fuel ratio control. The fuel injection quantity is corrected in accordance with the air-fuel ratio feedback correction coefficient α and air-fuel ratio learning correction coefficient αm. This embodiment can employ various known methods for calculating the air-fuel ratio feedback correction coefficient α and air-fuel ratio learning correction coefficient αm.

Step S54 determines a value of αm in each operating region by lookup in the current αm map for each operating region.

Then, step S55 examines whether the oil-diluting fuel quantity OF calculated in the flowchart of FIG. 2 is smaller than a predetermined estimation permitting dilution quantity LOF#. When OF<LOF#, the program proceeds to step S56 on the assumption that the influence of fuel evaporated from engine oil is small. When OF≧LOF#, the program ends without performing an alcohol concentration estimating operation.

Step S56 examines whether the absolute value of the variation quantity COF calculated in the flowchart of FIG. 2 is smaller than a predetermined estimation permitting dilution variation quantity LCOF#. When |COF|<LCOF#, the program proceeds to step S57 on the assumption that the influence of fuel evaporated from engine oil is small. When |COF|≧LCOF#, the program ends without performing an alcohol concentration estimating operation.

When both conditions of S55 and S56 are met (that is, OF is smaller than a desired value (LOF#) and |COF| is smaller than a desired value (LCOF#)), the process enters a path permitting the alcohol concentration estimation on the assumption that the influence of fuel evaporated from engine oil is little. In the example of FIG. 16, another permitting condition is checked at step S57 about the engine cooling water temperature, an elapsed time after a start of the engine, an operating condition of an air fuel ratio learning control, and the record of past refueling. When the first, second and third conditions of S55, S56 and S57 are met, the process proceeds to step S58. The program ends without estimation of alcohol concentration when at least one of the first, second and third conditions of S55, S56 and S57 is not satisfied.

Figure 18:
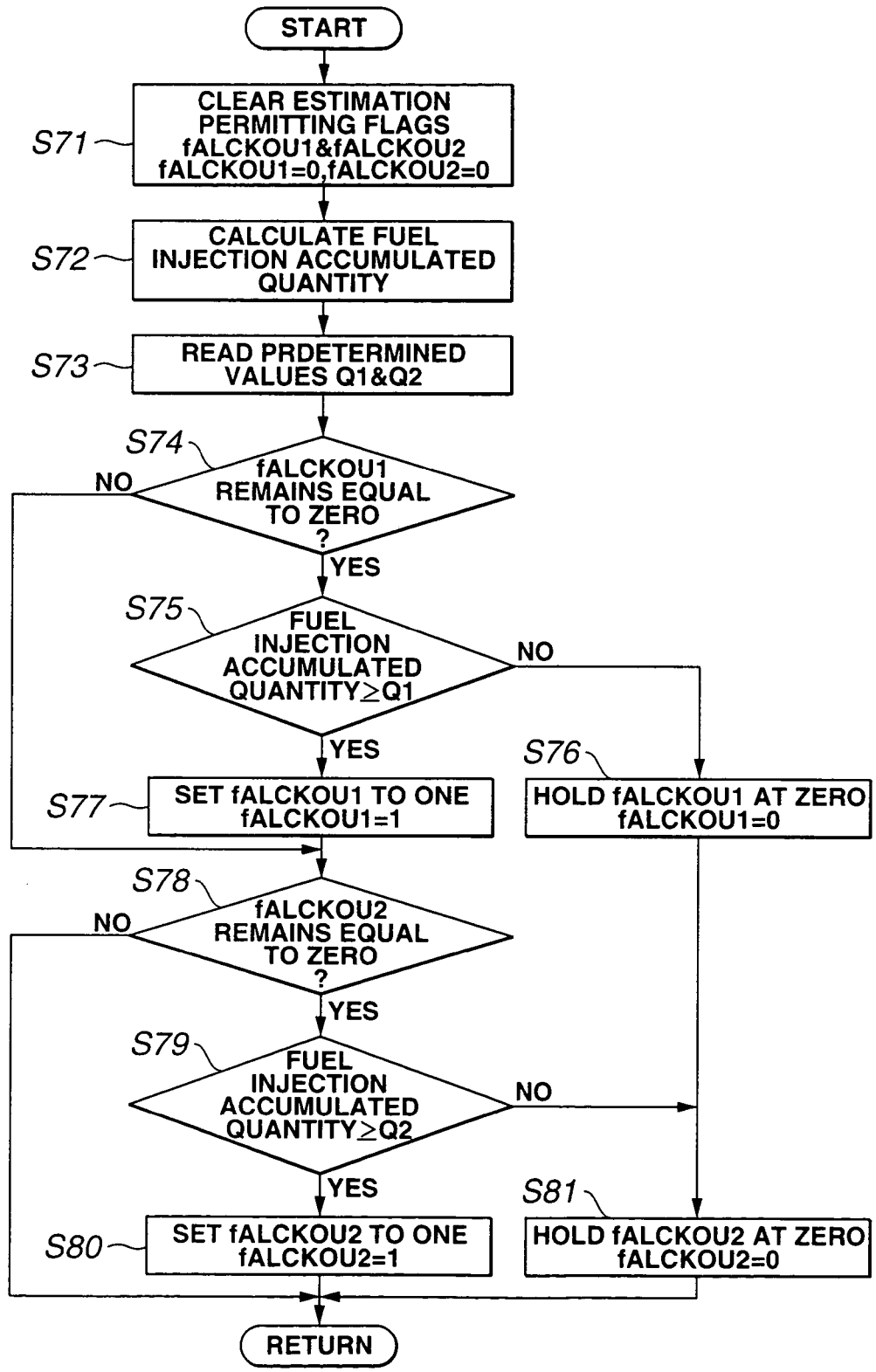
FIG. 18 is a flowchart of a process according to the first embodiment, for determining timings of first and second alcohol concentration estimating operations, by setting fALCKOU1 and fALCKOU2.

Step S58 reads alcohol concentration estimation permitting flags fALCKOU1 and fALCKOU2 which are set or reset in a process shown in FIG. 18.

Step S59 examines whether the second estimation permitting flag fALCKOU2 is equal to one, or not. When fALCKOU2=1, then the program proceeds to step S61. When fALCKOU2=0, and hence fALCKOU2≠1, then the program proceeds to step S60.

Step S60 examines whether the first estimation permitting flag fALCKOU1 is equal to one, or not. When fALCKOU1=1, then the program proceeds to step S61. When fALCKOU1=0, and hence fALCKOU1≠1, then the program ends without performing an alcohol concentration estimating operation.

Therefore, step S61 for estimating the alcohol concentration is reached only when fALCKOU1=1 or fALCKOU2=1.

Step 61 calculates an average of αm values in representative speed load regions. In this example, the average of αm is determined from the values of four speed load regions, and the alcohol concentration is calculated from the result by using a table shown in FIG. 17. It is desirable to select, as the representative four regions, regions which are used relatively frequently by the engine, and in which the intake air quantity is not so small. By so doing, it is possible to maintain a sufficient frequency of the learning, and the influence of oil-diluting fuel evaporating from engine oil is lowered by selecting a region having a relatively large intake air quantity.

Figure 17:
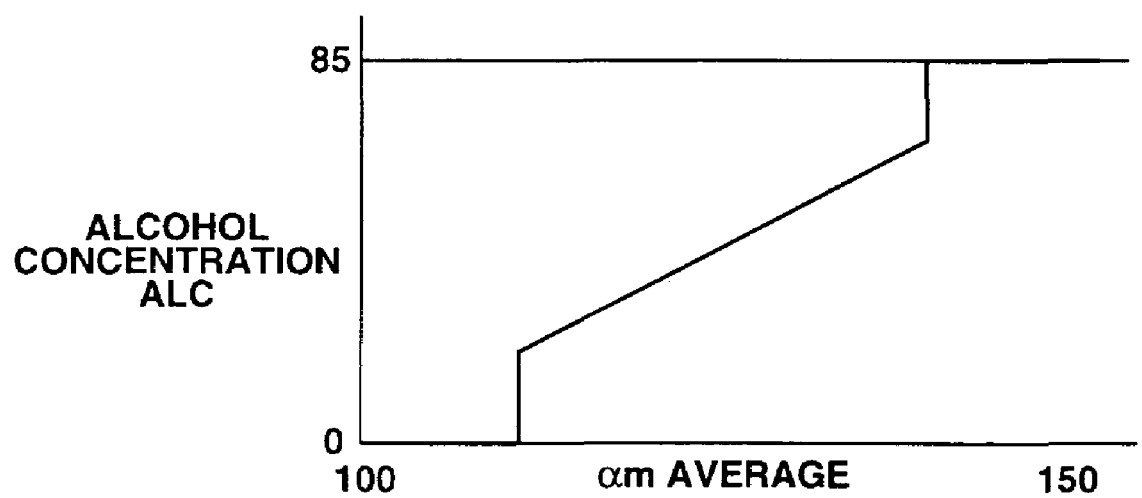
FIG. 17 is a graph showing a characteristic of an alcohol concentration calculation map used in the process of FIG. 16.

The table of FIG. 17 is designed to determine the alcohol concentration ALC from the average of αm. The characteristic shown in FIG. 17 has a dead band in which the alcohol concentration ALC is not changed with respect to changes in the average of αm. The dead band is provided to use a stable control value (a control constant) when gasoline is inserted or when a standardized blended fuel (gasoline-alcohol fuel) is always inserted. The above-mentioned control value (control constant) includes at least one of control constant about the ignition timing, constant about correction of wall flow of fuel, constant about ternary point adjustment of lambda control, and constant about cold enrichment. The dead band is provided because the repeatability of emission becomes poor if these are varied.

FIG. 18 shows a process for setting the first and second estimation permitting flags fALCKOU1 and fALCKOU2, according to the first embodiment.

Step S71 clears (resets to zero) the values of flags fAL-CKOU1 and fALCKOU2 (fALCKOU1=0 and fAL-CKOU2=0) when the alcohol concentration estimating process is performed by the process of FIG. 16. (Flags fALCKOU1 and fALCKOU2 are initially reset to zero when a power supply to the system is switched on.)

Step S72 calculates a fuel injection pulse accumulated quantity by summation of pulse widths of fuel injection pulses from a start of the engine, and further calculates a fuel injection accumulated quantity (or fuel supply accumulated quantity) after the engine start, from the fuel injection pulse accumulated quantity. The fuel injection accumulated quantity is a total quantity of fuel supplied to the engine from the start of the engine.

When fresh fuel having an alcohol concentration different from the alcohol concentration of old fuel existing in fuel tank 14 is supplied into fuel tank 14, the fresh fuel in fuel tank 14 can readily blend with the old or stale fuel already existing in fuel tank 14. Accordingly, it is possible to assume that the alcohol concentration become uniform is immediately after the fresh fuel is supplied into fuel tank 14. On the other hand, old fuel remaining in fuel line 13 can not readily blend with the fresh fuel newly poured into fuel tank 14. Therefore, when the engine is started after the supply of the fresh fuel into fuel tank 14, the alcohol concentration of fuel supplied or injected into the engine through fuel injector 10 is varied gradually from the old alcohol concentration of the old fuel remaining in fuel line 13, to the new alcohol concentration in fuel tank 14 as the old fuel is pushed out by the fuel injection. The fuel supplied to the engine is not switched to the fresh fuel until the old fuel remaining in fuel line 13 is consumed. Thus, the change-over from the old fuel to the fresh fuel is delayed by transportation lag of fuel remaining in fuel line 13. Therefore, the engine system of this embodiment monitors the progress of fuel consumption of the old fuel remaining in fuel line 13, by calculating the summation of fuel injection pulse widths. The fuel injection pulse width is calculated in accordance with the engine speed sensed crank angle sensor 18, and the intake air quantity sensed by air flowmeter 8.

Step S73 reads first and second predetermined values Q1 and Q2, which are determined experimentally. Predetermined values Q1 and Q2 are determined mainly by the layout of fuel line 13. First predetermined value Q1 is smaller than second predetermined value Q2 (Q1<Q2).

First predetermined value Q1 is a value representing a total amount of fuel injection from an engine start, until 80% of a change-over of the fuel is made from the alcohol concentration of the old fuel remaining in fuel line 13, to the alcohol concentration of the new fuel in fuel tank 14.

Second predetermined value Q2 is a value representing a total amount of fuel injection from an engine start, until the alcohol concentration of fuel injected into the engine is changed from the alcohol concentration of the old fuel remaining in fuel line 13, to the alcohol concentration of the new fuel in fuel tank 14, and disturbance having influence on the air fuel ratio control of the engine is settled down. Second value Q2 is determined so that a second estimating operation is performed after influence of disturbance such as blowby gases and wall flow has disappeared.

Step S74 examines whether the first estimation permitting flag fALCKOU1 continues to be equal to zero from the engine start. If fALCKOU1 is never set to one after the engine start, and remains at zero, then the program proceeds from S74 to step S75. If fALCKOU1 is once set to one by a setting operation of step S77 after the engine start, then the program proceeds to step S78.

Step S75 compares the fuel injection accumulated quantity calculated at S72, with first predetermined value Q1 obtained at S73; and transfers control to S77 if the fuel injection accumulated quantity is greater than or equal to Q1, and to S76 if the fuel injection accumulated quantity is still smaller than Q1.

Step S77 sets the first estimation permitting flag fAL-CKOU1 to one (fALCKOU1=1). Thereafter, the program proceeds to S78. On the other hand, step S76 holds the first estimation permitting flag fALCKOU1 equal to zero (fAL-CKOU1=0). After S76, step S81 holds the second estimation permitting flag fALCKOU2 equal to zero (fALCKOU2=0). After S81, the program of FIG. 18 ends.

Step S78 examines whether the second estimation permitting flag fALCKOU2 continues to be equal to zero from the engine start. If fALCKOU2 is never set to one after the engine start, and remains at zero, then the program proceeds from S78 to step S79. If fALCKOU2 is once set to one by a setting operation of step S80 after the engine start, then the program ends directly.

Step S79 compares the fuel injection accumulated quantity calculated at S72, with second predetermined value Q2 obtained at S73; and transfers control from S79 to S80 if the fuel injection accumulated quantity is greater than or equal to second predetermined value Q2, and to S81 if the fuel injection accumulated quantity is still smaller than Q2.

Step S80 sets the second estimation permitting flag fAL-CKOU2 to one (fALCKOU2=1). Thereafter, the program ends. On the other hand, step 81 holds the second estimation permitting flag fALCKOU2 equal to zero (fALCKOU2=0). After S81, the program of FIG. 18 ends.

Figure 19:
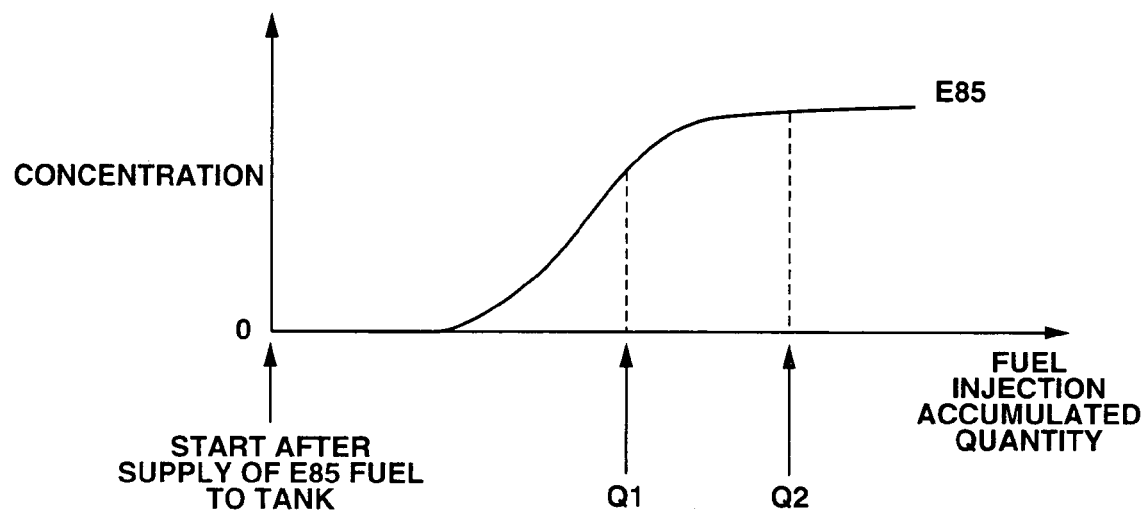
FIG. 19 is a graph illustrating the timings of the first and second alcohol concentration estimating operations determined by the process of FIG. 18.

FIG. 19 illustrates a first estimating timing of a first alcohol concentration estimating operation determined by first estimation permitting flag fALCKOU1, and a second estimating timing of a second alcohol concentration estimating operation determined by second estimation permitting flag fALCKOU2. In this example, E85 fuel (ethanol concentration is 85%) is supplied to fuel tank 14 after use of gasoline fuel (alcohol concentration is 0%).

After a start of the engine, the alcohol concentration of fuel injected into the engine is varied gradually as shown in FIG. 19 from the concentration of the old fuel (gasoline fuel) to the concentration of the new fuel (E85 fuel) in tank 14 as fuel is injected from fuel injector 10. In this example, the alcohol concentration of old fuel remaining in fuel line 13 is 0%, and the alcohol concentration of the new fuel poured into fuel tank 14 is 85%. In this case, the first predetermined value Q1 corresponds to a timing at which the alcohol concentration of fuel injected into the engine becomes equal to (85×0.8)%, and the injection fuel is changed over by approximately 80% to the new fuel in fuel tank 14. The second value Q2 corresponds to a timing at which disturbances to the engine air fuel ratio control has disappeared. At this timing, the alcohol concentration of injection fuel becomes approximately equal to the alcohol concentration of the new fuel in fuel tank 14.

In this way, the first alcohol concentration estimating operation after a start of the engine is carried out at the first estimating timing when the injection fuel is changed over by about 80% from the old fuel remaining in fuel line 13, to the new fuel in fuel tank 14; and the second alcohol concentration estimating operation is carried out at the second estimating timing when the injection fuel is fully changed over from the old fuel remaining in fuel line 13, to the new fuel in fuel tank 14, and disturbances to the air fuel ratio control has disappeared. The first estimating operation is effective for reducing the deviation of the is actual alcohol concentration of fuel actually injected, from the estimated alcohol concentration, and the second estimating operation is effective for improving the accuracy of the alcohol concentration estimation, and for preventing deterioration of engine starting performance and exhaust performance.

The estimating timings are determined on the basis of the fuel injection accumulated quantity after an engine start. Therefore, the estimating system can take account of the transportation delay in fuel line 13 correctly even if the fuel injection quantity is changed, and thereby improve the accuracy of the estimation to prevent deterioration of engine starting performance and exhaust performance.

Figure 20:
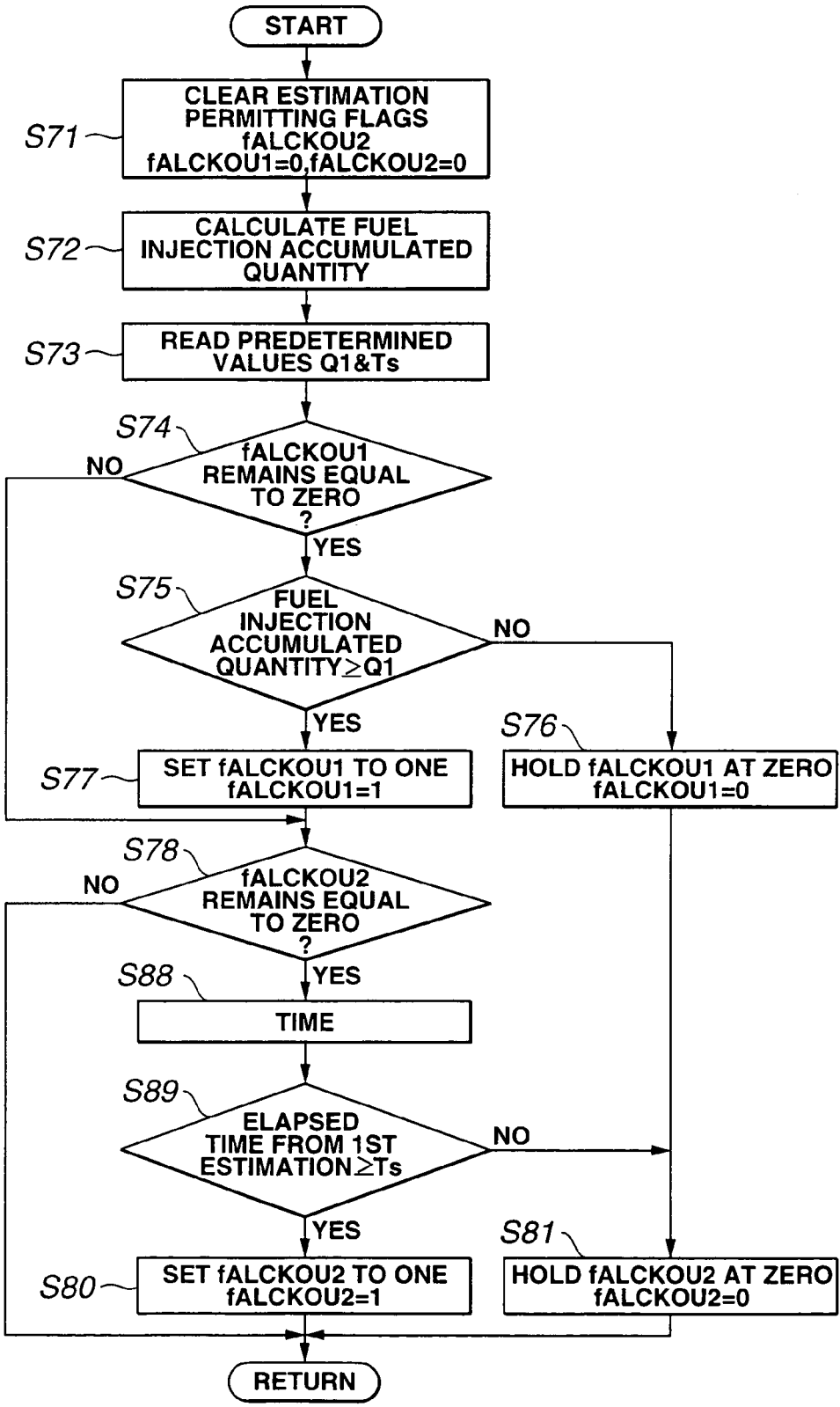
FIG. 20 is a flowchart of a process according to a second embodiment, for determining timings of first and second alcohol concentration estimating operations, by setting fALCKOU1 and fALCKOU2.

FIG. 20 shows an estimating timing determining process according to a second embodiment. In the second embodiment, FIG. 20 is substituted for FIG. 18 of the first embodiment. In other respects, the second embodiment is substantially identical to the first embodiment.

The process of FIG. 20 is substantially identical to the process of FIG. 18 in steps S71, S72, S74–S78, S80 and S81. In FIG. 20, S89 is substituted for S79 of FIG. 18, and S88 is added between S78 and S89. Step 73 reads Q1 & Ts. Step S88 is to measure an elapsed time T after the first alcohol concentration estimating operation which is performed when the fuel injection accumulated quantity becomes equal to Q1.

Step S89 compares the elapsed time after the first estimating operation with a predetermined time length Ts; and transfers control to S80 if the elapsed time after the first estimating operation becomes equal to or longer than the predetermined time length Ts, and to S81 if the elapsed time is shorter than the predetermined time length Ts. Preferably, the predetermined time length Ts is equal to or longer than 15 minutes; and equal to or shorter than 30 minutes. In this example, the predetermined time length Ts is equal to 25 minutes.

It is possible to determine the second estimation timing of the second alcohol concentration estimating operation by an elapsed time from an engine start. However, the first alcohol concentration estimating operation is performed only after various other conditions are satisfied such as a range of air fuel ratio feedback correction coefficient α, in addition to the condition of the first estimating permitting flag fALCKOU1. When the second estimating timing is determined by the elapsed time from the engine start, therefore, the second estimating operation may be carried out before the first estimating operation if the timing of the first estimating operation is retarded significantly by disturbances. To avoid such a problem, the estimating system of the second embodiment is arranged to carry out the second estimating operation at the expiration of a predetermined time interval after the first estimating operation.

This application is based on a prior Japanese Patent Application No. 2003-73062 filed on Mar. 18, 2003. The entire contents of this Japanese Patent Applications No. 2003-73062 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A fuel properties estimating apparatus for an internal combustion engine, the fuel properties estimating apparatus comprising:
   a controller to determine an estimated component concentration of a component in a fuel for the engine in accordance with an actual air fuel ratio of the engine, the controller being configured to perform a plurality of estimating operations to determine the estimated component concentration at predetermined timings after an engine start of the engine,
   wherein, in each of the estimating operations, the controller calculates the estimated component concentration by using a characteristic in which the estimated component concentration is increased in proportion to an air-fuel ratio correction quantity which is determined from the air fuel ratio.

2. The fuel properties estimating apparatus as claimed in claim 1, wherein the controller is configured to perform first and second estimating operations to determine the estimated component concentration in accordance with the actual air fuel ratio, respectively, at first and second estimating timings after the engine start;
   the first estimating timing being a timing so determined that the first estimating operation is performed when fuel supplied to the engine is almost switched from fuel remaining in a fuel line from a fuel tank to the engine at the time of the engine start, to fuel existing in the fuel tank at the time of the engine start; and
   the second estimating timing being a timing so determined that the second estimating operation is performed when disturbance to an air fuel ratio control based on the actual air fuel ratio is settled down.

3. The fuel properties estimating apparatus as claimed in claim 2, wherein the controller is configured to perform the first estimating operation when a fuel injection accumulated quantity after the engine start becomes equal to a predetermined value which is so determined that the first estimating operation is performed when fuel supplied to the engine is switched by a predetermined percentage from the fuel remaining in the fuel line at the time of the engine start, to the fuel existing in the fuel tank at the time of the engine start.

4. The fuel properties estimating apparatus as claimed in claim 3, wherein the controller is configured to perform the second estimating operation at the expiration of a predetermined time interval after the first estimating operation.

5. The fuel properties estimating apparatus as claimed in claim 1, wherein the controller is configured to calculate a fuel supply accumulated quantity after the engine start, and to determine a first estimating timing of a first estimating operation to determine the estimated component concentration in accordance with the fuel supply accumulated quantity after the engine start.

6. The information system as claimed in claim 5, wherein the controller is configured to perform a second estimating operation to determine the estimated component concentration at the expiration of a predetermined time interval after the first estimating operation.

7. The fuel properties estimating apparatus as claimed in claim 6, wherein the predetermined time interval is equal to or longer than 15 minutes, and equal to or shorter than 30 minutes.

8. The fuel properties estimating apparatus as claimed in claim 5, wherein the controller is configured to compare the fuel supply accumulated quantity with a predetermined value corresponding to a predetermined percentage of fuel remaining in a fuel pipe from a fuel tank to the engine; and to perform the first estimating operation when the fuel supply accumulated quantity becomes equal to the predetermined value.

9. The fuel properties estimating apparatus as claimed in claim 8, wherein the controller is configured to measure an elapsed time after the first estimating operation, and to perform a second estimating operation when the elapsed time after the first estimating operation becomes equal to a predetermined time length.

10. The fuel properties estimating apparatus as claimed in claim 8, wherein the controller is configured to compare the fuel supply accumulated quantity with a second predetermined value, and to perform a second estimating operation after the first estimating operation when the fuel supply accumulated quantity becomes equal to the second predetermined value.

11. The fuel properties estimating apparatus as claimed in claim 1, wherein the component is alcohol, and the estimated component concentration is an estimated alcohol concentration in the fuel for the engine.

12. A fuel properties estimating process for an internal combustion engine, the fuel properties estimating process comprising:
performing a first estimating operation at a first estimating timing after an engine start of the engine, to determine an estimated component concentration of a component in a fuel for the engine in accordance with an actual air fuel ratio of the engine; and
performing a second estimating operation at a second estimating timing after the first estimating operation, to determine the estimated component concentration in accordance with the actual air fuel ratio of the engine,
wherein, in each of the first and second estimating operations, the estimated component concentration is calculated by using a characteristic in which the estimated component concentration is increased in proportion to an air-fuel ratio correction quantity which is determined from the air fuel ratio.

13. The fuel properties estimating process as claimed in claim 12, wherein the fuel properties estimating process further comprises:
calculating a fuel supply accumulated quantity after the engine start; and
determining the first estimating timing by comparing the fuel supply accumulated quantity with a predetermined value.

14. A fuel properties estimating apparatus for an internal combustion engine, the fuel properties estimating process comprising:

means for determining a first estimating timing after an engine start of the engine;
means for performing a first estimating operation at the first estimating timing, to determine an estimated component concentration of a component in a fuel for the engine in accordance with an actual air fuel ratio of the engine;
means for determining a second estimating timing after the first estimating timing; and
means for performing a second estimating operation at the second estimating timing after the first estimating operation, to determine the estimated component concentration in accordance with the actual air fuel ratio of the engine,
wherein, in each of the first and second estimating operations, the estimated component concentration is calculated by using a characteristic in which the estimated component concentration is increased in proportion to an air-fuel ratio correction quantity which is determined from the air fuel ratio.

15. A fuel properties estimating apparatus for an internal combustion engine, the fuel properties estimating apparatus comprising:
an air-fuel ratio sensor configured to sense an actual exhaust air-fuel ratio of the engine; and
a controller configured:
to ascertain an air-fuel ratio feedback correction coefficient used for a feedback air-fuel ratio correction control, in accordance with the actual air fuel ratio of the engine,
to determine first and second estimating timings to perform a plurality of estimating operations to determine an estimated component concentration of a component in a fuel for the engine, after an engine start of the engine, and
to calculate the estimated component concentration from the air-fuel ratio correction coefficient at each of the first and second timings so as to increase the estimated component concentration with an increase in the air-fuel ratio feedback correction coefficient, by using a characteristic having a dead band to hold the estimated component concentration substantially constant without regard to variation in the air-fuel ratio correction quantity in a predetermined region of the air-fuel ratio correction quantity.

* * * * *